3,194,736
ANHYDROUS DEPILATORY STICK
Ernest Braun, Forest Hills, N.Y., and John E. Logun, North Caldwell, N.J., assignors to Chemway Corporation, Wayne, N.J., a corporation of Delaware
No Drawing. Filed Mar. 6, 1962, Ser. No. 177,746
5 Claims. (Cl. 167—89)

This invention relates to a depilatory composition. More particularly this invention relates to an anhydrous, stable, depilatory composition in solid stick form containing as the essential active depilating agent a substituted thiol in which the hydrogen atom in hydrogen sulfide is substituted by various organic residues.

Depilatory compositions containing substituted thiols, particularly thioglycollates, are well known in the art and are commercially available generally as pastes or creams or as powders to be admixed with water to form a paste just prior to use. The depilatory pastes suffer from the disadvantage that they contain water and are inherently unstable, having short shelf lives, due primarily to the decomposition of the substituted thiol components with the formation of offensive sulphidic odors. The dry powders, although stable, are inconvenient of application.

The depilatory compositions of this invention are unique in that they are in an anhydrous, solid stick form. Since they are anhydrous, they are indefinitely stable and hence are free from any offensive sulphidic odors. In addition, it has been found that the cooperative action of the wetted skin and the residual water present as a skin component provides sufficient water so that contact of the solid stick form depilatory composition with a wetted skin area creates a cream containing an ionized active depilatory capable of complete depilation in less than ten minutes. Moreover, it has been found that the time required for effective depilation is not sufficient to permit formation of offensive sulphidic odors so that when the cream is removed, the skin retains an odor of perfume. Also, the composition of the solid stick form depilatory prevents penetration of externally applied water into the stick so that there is no significant decomposition of the active depilating agent with formation of offensive sulphidic odors after use. The anhydrous solid stick form depilatory compositions of this invention can be conveniently packaged, for example, in lipstick-like containers and provide a cosmetically elegant, odorless, safe and effective answer to the problem of facial hypertrichosis.

The depilatory compositions of this invention consist essentially of a solid stick base comprising a sterol, a non-ionic polyalkenoxy type water-in-oil emulsifier, and a solid, inert, organic filler material, the solid stick base having intimately dispersed therein an admixture of a solid basic material, which can be any of guanadine or the alkali and alkaline earth metal hydroxides, carbonates, silicates and tribasic phosphates, and as the essential active depilating agent, an effective depilating amount of a substituted thiol in which the hydrogen atom in hydrogen sulfide is substituted by an organic residue containing two to four carbon atoms and at least one of a group selected from the class consisting of hydroxyl, ketone, aldehyde, ether, amine, sulfonic acid, carboxylic acid and carboxylic acid salt groups, the solid basic material being present in an amount sufficient to provide a pH of 10.5 to 12.5 in a saturated aqueous solution of the depilatory composition.

The solid stick base serves to sequester the irritation factor of the ionized active ingredients and gives protective emolliency to the sensitive skin, particularly facial, areas. Hence the solid stick base contains a sterol to provide hydrophilic and emollient properties, a solid inert, organic filler material to provide body and to prevent penetration of externally applied water, and a non-ionic polyalkenoxy type water-in-oil emulsifier to provide homogeneity to the final composition and to supplement the emollient, hydrophilic and sequestering properties of the sterol.

Useful sterols are those of animal and vegetable origin conventionally employed in cosmetic and pharmaceutical preparations and include the $C_{27}$-$C_{29}$ compounds such as cholesterol, cholestanol, epicholestanol, coprostanol, epicoprostanol, lathosterol, 7-dehydrocholesterol, ergosterol, ergostanol, 5,6-dihydroergosterol, cerevisterol, zymosterol, brassicasterol, campesterol, stigmasterol, stigmastanol, the sitosterols, fucosterol, chalinasterol, poriferasterol, clionasterol, spongosterol, cerebrosterol and $C_{30}$ compounds such as lanosterol and agnosterol. Preferably, the sterol is the unsaponifiable lanolin fraction of commerce containing principally lanolin alcohols. These are available commercially as "Cerelan," "Amerchol," "Hartolan" and "Dusoran 60" and are described in an article by Gabriel Barnett in "Drug and Cosmetic Industry," Vol. 80, No. 5 (May 1957). The unsaponifiable lanolin fraction can be in solid form, semi-solid form, or portions in liquid form, i.e. dispersed in a mineral oil vehicle, can be admixed with portions in solid form. The solid stick base will generally contain about 10 to 55 percent by weight of sterol.

The non-ionic polyalkenoxy water-in-oil emulsifiers include those conventionally employed in cosmetic and pharmaceutical preparations. Preferably employed is a sterol such as those described above which has been reacted with an alpha-beta alkylene oxide containing 2 to 4 carbon atoms such as ethylene oxide, propylene oxide and butylene oxide. The amount of alkylene oxide reacted with the sterol or lanolin alcohol fraction is sufficient to impart hydrophilic surface active properties and generally ranges from about 10 to 40 moles of alkylene oxide per mole of sterol. These are marketed commercially as "Polychols" and "Solulans." Also useful are the group of reaction products of lanolin and hexitan ester polyoxyethylene ethers obtained by reacting lanolin with a polyoxyethylene ether of a hexitol or a hexitol ester such as sorbitol or sorbitol monostearate in the presence of an alkali and sold commercially as Atlas G–1425, G–1441, and G–1471. Ethoxylated lanolin derivatives obtained by reacting lanolin with ethylene oxide and marketed as "Lanogel," "Ethoxylan" and "Etholan" are suitable.

Although the ethoxylated lanolin derivatives are preferable, other non-ionic polyalkenoxy water-in-oil emulsifiers are useful. Thus there can be used the conventional non-ionic polyethenoxy surface active agents and these include the oxyethylated polyoxypropylene glycols described in U.S. Patent 2,674,619 to Lunsted and sold commercially as "Pluronics," the oxyalkylated partial esters of polyhydric alcohols and fatty acids described in U.S. Patent 2,380,166 and sold commercially as "Tweens," the benzyl ethors of alkylphenoxy polyethoxyethanols described in U.S. Patent 2,856,434 to Niederhauser and sold commercially as "Triton CF–10," the polyoxyalkylene surfactants described in U.S. Patent 2,677,700 to Jackson et al., the mixed higher polyoxyalkylene ethers of hexitols described in U.S. Patent 2,673,882 to Griffin, alkylphenoxy polyoxyethylene ethanols produced by the reaction of an alkylphenol with ethylene oxide and sold commercially as "Igepals," the oxyalkylated glycerols, produced by reaction with glycerol of a mixture of ethylene and propylene oxides, marketed by Dow Chemical Co., and the fatty alcohol ethers such as the cetyl, stearyl, lauryl or oleyl ethers of ethylene oxide polymers. The solid stick base will generally contain about 10 to 40 percent by weight of the non-ionic polyalkenoxy water-in-oil emulsifier.

The anhydrous, solid stick base also contains the usual anhydrous solid, inert, organic filler materials or absorption base components conventionally employed in cosmetic and pharmaceutical preparations. These include natural and synthetic waxes, semi-solid and solid hydrocarbons, starches, gums and resins. Specifically included are those most commonly used such as petrolatum, paraffin wax, microcrystalline wax, stearyl, lauryl, oleyl and cetyl alcohols, methyl cellulose, spermaceti, beeswax, ceresin, lecithin and cephalin and the hydrogenated vegetable oils. The anhydrous, solid stick base can also contain small amounts of inorganic filler materials such as bentonite. The solid stick base will generally contain up to about 75 percent by weight of solid, inert, organic filler material.

The active depilating agent of the composition of this invention is a substituted thiol in which the hydrogen atom in hydrogen sulfide is substituted by an organic residue containing two or four carbon atoms and at least one of a group selected from the class consisting of hydroxyl, ketone, aldehyde, ether, amine, sulfonic acid, carboxylic acid and carboxylic acid salt groups. Such materials are well known and are described in U.S. Patent 2,352,524 issued June 27, 1944, to Ralph L. Evans et al. and British Patent 521,240 (1940) to Ralph L. Evans et al. As explained in those patents, the thiol group normally has a pronounced disagreeable odor unless the organic group attached to the thiol group has one or more substituent groups such as hydroxyl, ketone, aldehyde, ether, amine, sulfonic acid, carboxylic acid or carboxylic acid salt groups. The most effective and least odiferous are the guanadine, ethylene diamine, alkali and alkaline earth metal salts of thioglycollic acid and thiolactic acid, including specifically the guanadine, ethylene diamine mono- and di-, sodium, potassium and calcium thioglycollates and thiolactates. The preferred active agent is calcium thioglycollate. The final depilatory composition will generally contain about 10 to 35 percent by weight of the substituted thiol.

The activating agent for the thioglycollate is a solid basic material which can be any of guanadine or the alkali and alkaline earth metal hydroxides, carbonates, silicates, and tribasic phosphates, preferably iron free since iron forms discoloration in the presence of a substituted thiol. The solid basic substance must be present in an amount sufficient to provide a basic medium for the depilating agent when contacted with the wetted skin and the final depilatory composition will thus generally contain about 5 to 25 percent by weight of solid basic material sufficient to provide a pH of 10.5 to 12.5 in a saturated aqueous solution of the depilatory composition, preferably a pH of 11 to 12. A lower pH requires more time for effective depilation and a higher pH tends to produce irritation.

The anhydrous solid stick base, the substituted thiol and the solid basic substance are admixed in order to provide a final depilatory composition in stick form having intimately dispersed therein the substituted thiol and the solid basic material. A small amount of perfume, i.e. 1 to 2 percent by weight of the final depilatory composition, can be incorporated into the final depilatory composition.

Depilatory compositions in solid stick form of this invention are illustrated by the following examples. In the examples, commercial unsaponifiable lanolin fractions containing primarily lanolin alcohols were employed. These are designated Lanolin Fractions A, B and C and their respective properties are set forth in the following Table I. The unsaponifiable lanolin fractions of Table I are semi-solid or liquid (dissolved in liquid petrolatum) multisterol, non-ionic, surface-active emulsifiers and emollients. The active factors are cholesterol and related sterols, as well as complex higher alcohols, all of natural lanolin origin. Among the sterols present are cholesterol, agnosterol, lanosterol, 7-dehydrocholesterol, dihydrocholesterol and cerebrosterol. These are present in their free forms (as the alcohols). There are no fatty acids or esters. The absence of acids, alkalies, esters, amines, soaps, glycols, and resins makes these fractions physically and chemically inert. Also employed in the examples was a commercial oxyethylated select lanolin alcohol fraction containing 25 moles of ethylene oxide per mole of lanolin alcohol condensed in ether form and designated Ethoxylated Fraction D. The specifications for this material are as follows:

Appearance—solid mass.
Color—tan.
Odor—slight fatty odor.
Consistency—waxy solid.
Solubility in water—freely soluble.
Solubility in alcohol—freely soluble.
Acid number—1.
Hydroxyl number—54.
Saponification number—9.
pH (10% aqueous solution) at 25° C.—6.0.
Cloud point (1% solution in 5% NaCl)—87° C.

TABLE I

| Specifications | Lanolin Fraction A | Lanolin Fraction B | Lanolin Fraction C |
| --- | --- | --- | --- |
| Appearance | Semi-solid mass | Semi-solid mass | Oily Liquid. |
| Color | Cream | Pale Yellow | Pale Yellow. |
| Odor | Faint and Pleasant | Slightly Pleasant | Faint, Characteristic sterol odor. |
| Melting Point (USPXV—CLASS II) | 43°–46° C | 60° C | |
| Viscosity (Saybolt at 38° C.) | | | 80 to 90. |
| pH {Brom Thymol Blue} (10% Water emulsion) at 25° C. | 7.0 | 5.5 | 7.0. |
| Specific Gravity at 25° C. | 0.845 to 0.855 | 0.840 to 0.855 | 0.835 to 0.845. |
| Moisture | Anhydrous | Anhydrous | Anhydrous. |
| Ash | None | None | None. |
| Acid Number | Negligible | Negligible | Negligible. |
| Ester Number | Negligible | Negligible | Negligible. |
| Bulk (lbs. per gallon) | 7 | 7 | 7. |

*Example 1*

An anhydrous stick base was prepared by admixing in a vessel heated to about 90° C. the following materials in the indicated proportions:

| Ingredients: | Parts by weight |
| --- | --- |
| Lanolin Fraction A | 5 |
| Lanolin Fraction B | 25 |
| Ethoxylated Fraction D | 20 |
| Paraffin, NFXI | 20 |
| Petrolatum, U.S.P. | 15 |
| Stearyl alcohol, U.S.P. | 15 |
| | 100 |

The admixture (stick base) was permitted to cool to about 75° C. at which time calcium hydroxide, strontium hydroxide and calcium thioglycollate were added in amounts sufficient to give an intermediate having the proportions indicated below:

| Ingredients: | Parts by weight |
| --- | --- |
| Calcium hydroxide, USP (iron free) | 4.0 |
| Strontium hydroxide, CP (iron free) | 8.0 |
| Calcium thioglycollate·3H$_2$O | 17.0 |
| Stick base | 70.0 |
| | 99.0 |

The admixture was then milled until the temperature dropped to about 55° C. at which time a perfume was added and thoroughly mixed in to provide a final admixture having the proportions indicated below:

| Ingredients: | Parts by weight |
| --- | --- |
| Calcium hydroxide, USP (iron free) | 4.0 |
| Strontium hydroxide, CP (iron free) | 8.0 |
| Calcium thioglycollate·3H$_2$O | 17.0 |
| Stick base | 70.0 |
| Perfume | 1.0 |
| | 100.0 |

This final admixture was then poured into chilled lipstick-type molds to provide a final product in conveniently sized solid stick form. These solid sticks were subjected to various tests which showed that they were compatible with all types of metal and plastic containers conventionally employed for packaging lipstick and similar items. Several solid sticks were subjected to severe stability tests involving placing them in closed boxes wherein the temperature was maintained at 40° C. and the relative humidity at the conventional level and at 80% and 100% for 60 days. After maintenance under these conditions, the sticks were still in solid form and their depilating action was not significantly impaired. Other sticks were exposed to the open air under ambient conditions for periods of six weeks and longer with similar results.

The sticks were tested for depilating action in the following manner: A small amount of water was spread on about a three square inch area of a male human forearm having considerable hair. The stick was dipped into water and applied with a circular motion to the wetted skin area, for 10 to 30 seconds, until a white cream had formed. After five minutes, the stick was again dipped in water and applied with a circular motion to the wetted skin area. After an additional five minutes, the cream was removed with a paper tissue leaving a skin area devoid of hair and stubble, and having a fragrant odor.

*Example 2*

An anhydrous stick base was prepared similarly as in Example 1 from the following materials in the indicated proportions:

| Ingredients: | Parts by weight |
| --- | --- |
| Lanolin Fraction A | 5.0 |
| Lanolin Fraction B | 20.0 |
| Lanolin Fraction C | 5.0 |
| Ethoxylated Fraction D | 20.0 |
| Paraffin, NFXI | 20.0 |
| Petrolatum, USP | 20.0 |
| Stearyl alcohol, USP | 10.0 |
| | 100.0 |

This admixture was admixed and milled with calcium hydroxide, strontium hydroxide, calcium thioglycollate and perfume as described in Example 1 to give a final admixture having the proportions indicated below:

| Ingredients: | Parts by weight |
| --- | --- |
| Calcium hydroxide, USP (iron free) | 4.0 |
| Strontium hydroxide, CP (iron free) | 6.0 |
| Calcium thioglycollate·3H$_2$O | 15.0 |
| Stick base | 74.0 |
| Perfume | 1.0 |
| | 100.0 |

Similarly as in Example 1, the admixture was poured into chilled molds.

*Example 3*

An anhydrous stick base was prepared similarly as in Example 1 from the following materials in the indicated proportions:

| Ingredients: | Parts by weight |
| --- | --- |
| Lanolin Fraction A | 5.0 |
| Lanolin Fraction C | 10.0 |
| Ethoxylated Fraction D | 35.0 |
| Paraffin, NFXI | 10.0 |
| Beeswax | 10.0 |
| Stearyl alcohol, USP | 30.0 |
| | 100.0 |

This admixture was admixed and milled with calcium hydroxide, strontium hydroxide, calcium thioglycollate containing water of crystallization in perfume as described in Example 1 to give a final admixture having the proportions indicated below:

| Ingredients: | Parts by weight |
| --- | --- |
| Calcium hydroxide, USP (iron free) | 6.0 |
| Strontium hydroxide, CP (iron free) | 12.0 |
| Calcium thioglycollate·3H$_2$O | 25.5 |
| Stick base | 55.5 |
| Perfume | 1.0 |
| | 100.0 |

Similarly as in Example 1, the admixture was poured into chilled molds.

*Example 4*

An anhydrous stick base was prepared similarly as in Example 1 from the following materials in the indicated proportions:

| Ingredients: | Parts by weight |
| --- | --- |
| Lanolin Fraction A | 5.0 |
| Lanolin Fraction C | 25.0 |
| Ethoxylated Fraction D | 20.0 |
| Petrolatum, USP | 15.0 |
| Cholesterol, USP | 20.0 |
| Stearyl alcohol, USP | 15.0 |
| | 100.0 |

This admixture was admixed and milled with calcium carbonate, calcium hydroxide, strontium hydroxide, calcium thioglycollate and perfume to give a final mixture having the proportions indicated below:

| Ingredients: | Parts by weight |
| --- | --- |
| Calcium carbonate (iron free) | 4.0 |
| Calcium hydroxide, USP (iron free) | 4.0 |
| Strontium hydroxide, CP (iron free) | 4.0 |
| Calcium thioglycollate·3H$_2$O | 17.0 |
| Stick base | 70.0 |
| Perfume | 1.0 |
| | 100.0 |

Similarly as in Example 1, the admixture was poured into chilled molds.

*Example 5*

An anhydrous stick base was prepared similarly as in Example 1 from the following materials in the indicated proportions:

| Ingredients: | Parts by weight |
| --- | --- |
| Lanolin Fraction A | 15.0 |
| Ethoxylated Fraction D | 10.0 |
| Mineral oil, USP | 25.0 |
| Petrolatum, USP | 25.0 |
| Paraffin, NFXI | 10.0 |
| Stearyl alcohol USP | 15.0 |
| | 100.0 |

This admixture was admixed and milled with calcium hydroxide, strontium hydroxide, calcium thioglycollate, Duponol C and perfume as described in Example 1 to give a final admixture having the proportions indicated below:

| Ingredients: | Parts by weight |
|---|---|
| Calcium hydroxide, USP (iron free) | 5.0 |
| Strontium hydroxide, CP (iron free) | 10.0 |
| Calcium thioglycollate·3H$_2$O | 21.25 |
| Stick base | 61.25 |
| Duponol C,[1] USP | 1.5 |
| Perfume | 1.0 |
| | 100.0 |

[1] Duponol C is sodium lauryl sulfate in powder form.

Similarly as in Example 1, the admixture was poured into chilled molds.

*Example 6*

An anhydrous stick base was prepared similarly as in Example 1 from the following materials in the indicated proportions:

| Ingredients: | Parts by weight |
|---|---|
| Lanolin Fraction A | 5.0 |
| Lanolin Fraction C | 25.0 |
| Ethoxylated Fraction D | 20.0 |
| Petrolatum, USP | 15.0 |
| Ozokerite 170[1] | 20.0 |
| Stearyl alcohol, USP | 15.0 |
| | 100.0 |

[1] Ozokerite 170 is a refined mineral wax.

This admixture was admixed and milled with calcium hydroxide, calcium carbonate, strontium hydroxide, calcium thioglycollate and perfume as described in Example 1 to give a final admixture having the proportions indicated below:

| Ingredients: | Parts by weight |
|---|---|
| Calcium hydroxide, USP (iron free) | 4.0 |
| Calcium carbonate | 4.0 |
| Strontium hydroxide, CP (iron free) | 4.0 |
| Calcium thioglycollate·3H$_2$O | 17.0 |
| Stick base | 70.0 |
| Perfume | 1.0 |
| | 100.0 |

Similarly as in Example 1, the admixture was poured into chilled molds.

*Example 7*

An anhydrous stick base was prepared similarly as in Example 1 from the following materials in the indicated proportions:

| Ingredients: | Parts by weight |
|---|---|
| Lanolin Fraction A | 5.0 |
| Lanolin Fraction C | 25.0 |
| Lantox 100[1] | 20.0 |
| Petrolatum, USP | 15.0 |
| Paraffin, NFXI | 20.0 |
| Stearyl alcohol, USP | 15.0 |
| | 100.0 |

[1] Lantox 110 is an oxyethylated lanolin alcohol fraction.

This admixture was admixed and milled with calcium hydroxide, calcium carbonate, strontium hydroxide, calcium thioglycollate and perfume as described in Example 1 to give a final admixture having the proportions indicated below:

| Ingredients: | Parts by weight |
|---|---|
| Calcium hydroxide, USP (iron free) | 4.0 |
| Calcium carbonate | 4.0 |
| Strontium hydroxide, CP (iron free) | 4.0 |
| Calcium thioglycollate·3H$_2$O | 17.0 |
| Stick base | 70.0 |
| Perfume | 1.0 |
| | 100.0 |

Similarly as in Example 1, the admixture was poured into chilled molds.

As shown by the above examples, the depilatory compositions of this invention can be formed from a wide range of materials so long as they are substantially anhydrous. The various ingredients can be in solid or liquid form provided that the respective proportions of solid and liquid are such as to give a final product having a melting point of at least about 40° C. so that they can be shipped in warm climates without losing shape. Also the various ingredients and their proportions should be chosen so as to provide a depilatory composition soft enough to dissolve readily when applied to a wetted skin area. Also, the ingredilents, especially the surface active materials, should be stable under conditions of relatively high alkalinity.

Suitable perfumes are those conventionally employed in cosmetics and soaps and include animal perfumes such as musk, civet, ambergris and castor, as well as vegetable perfumes such as sage, thyme, mint, cinnamon, cassia, cedar, sandal wood, rose, violet, anise, caraway, orris, orange, camphor and myrrh and mixtures thereof.

We claim:
1. An anhydrous, stable depilatory composition in solid stick form consisting essentially of a solid stick base consisting of a sterol, a non-ionic polyalkenoxy water-in-oil emulsifier, and a solid, inert, organic filler material, said solid stick base having intimately dispersed therein a solid basic material selected from the class consisting of guanadine, alkali metal hydroxides, alkali metal carbonates, alkali metal silicates, alkali metal tribasic phosphates, alkaline earth metal hydroxides, alkaline earth metal carbonates, alkaline earth metal silicates and alkaline earth metal tribasic phosphates, and as the essential active depilating agent, an effective depilating amount of depilating material selected from the class consisting of guanadine thioglycollate, ethylene diamine thioglycollate, alkaline earth metal thioglycollate, alkali meta thioglycollate, guanadine thioactate, ethylene diamine thiolactate, alkaline earth metal thioactate and alkali metal thiolactate, the solid basic material being present in an amount sufficient to provide a pH of 10.5 to 12.5 in a saturated aqueous solution of the depilatory composition.

2. An anhydrous, stable depilatory composition in solid stick form consisting essentially of a solid stick base consisting of an unsaponifiable lanolin fraction, a non-ionic polyethenoxy surface active agent, and a solid, inert, organic filler material, said solid stick base having intimately dispersed therein an admixture of about 5 to 25 percent by weight based on the final depilatory composition of a solid basic material selected from the class consisting of guanadine, alkali metal hydroxides, alkali metal carbonates, alkali metal silicates, alkali metal tribasic phosphates, alkaline earth metal hydroxides, alkaline earth metal carbonates, alkaline earth metal silicates and alkaline earth metal tribasic phosphates and as the essential active depilating agent, about 10 to 35 percent by weight based on the final depilatory composition of a material selected from the class consisting of guanadine thioglycollate, ethylene diamine thioglycollate, alkaline earth metal thioglycollate, alkali metal thioglycollate, guanadine thioactate, ethylene diamine thiolactate, alkaline earth metal thiolactate and alkali metal thiolactate.

3. An anhydrous, stable depilatory composition in solid stick form consisting essentially of
   (a) a solid stick base consisting of about 10 to 55 percent by weight of an unsaponifiable lanolin fraction, 10 to 40 percent by weight of the reaction product of an unsaponifiable lanolin fraction and 10 to 40 moles per mole of unsaponifiable lanolin fraction of an alpha-beta alkylene oxide having from 2 to 4 carbon atoms, and up to 75 percent by weight of a solid, inert, organic filler material, and intimately dispersed in said solid stick base, (b) an admixture of about 5 to 25 percent by weight based on the final depilatory composition of a solid basic material selected from the class consisting of guanadine, alkali metal hydroxides, alkali metal carbonates, alkali metal silicates, alkali metal tribasic phosphtes, alkaline earth metal hydroxides, alkaline earth metal carbonates, alkaline earth metal silicates and alkaline earth metal tribasic phosphates and as the essential active depilating agent, about 10 to 35 percent by weight based on the final depilatory composition of a material selected from the class consisting of guanadine thioglycollate, ethylene diamine thioglycollate, alkaline earth metal thioglycollate, alkali metal thioglycollate, guanadine thioacetate, ethylene diamine thiolactate, alkaline earth metal thiolactate and alkali metal thiolactate, the solid basic material being present in an amount sufficient to provide a pH of 10.5 to 12.5 in a saturated aqueous solution of the depilatory composition.

4. An anhydrous, stable depilatory composition in solid stick form consisting essentially of about 70 percent by weight of
 (a) a solid stick base consisting of about 30 percent by weight of an unsaponifiable lanolin fraction, about 20 percent by weight of an unsaponifiable lanolin fraction reacted with about 25 moles of ethylene oxide per mole of lanolin fraction, about 15 percent by weight of petrolatum, about 20 percent by weight of paraffin wax, about 15 percent by weight of stearyl alcohol, and intimately dispersed in said solid stick base,
 (b) about 4 percent by weight of calcium hydroxide, about 8 percent by weight of strontium hydroxide, about 17 percent by weight of calcium thioglycollate, and 1 percent by weight of perfume.

5. An anhydrous, stable depilatory composition in solid stick form consisting essentially of about 74 percent by weight of
 (a) a solid stick base consisting of about 30 percent by weight of an unsaponifiable lanolin fraction, about 20 percent by weight of an unsaponifiable lanolin fraction reacted with about 25 moles of ethylene oxide per mole of lanolin fraction, about 15 percent by weight of petrolatum, about 20 percent by weight of paraffin wax, about 15 percent by weight of stearyl alcohol, and intimately dispersed in said solid stick base,
 (b) about 4 percent by weight of calcium hydroxide, about 6 percent by weight of strontium hydroxide, about 15 percent by weight of calcium thioglycollate, and 1 percent by weight of perfume.

References Cited in the file of this patent
UNITED STATES PATENTS

| | | |
|---|---|---|
| 1,869,782 | Sternberg | Aug. 2, 1932 |
| 2,487,558 | Kamlet | Nov. 8, 1949 |

FOREIGN PATENTS

| | | |
|---|---|---|
| 484,467 | Great Britain | Apr. 27, 1938 |
| 636,181 | Great Britain | Apr. 2, 1950 |

OTHER REFERENCES

Barnett: Drug and Cosmetic Industry, 80(5)(6): 610–612, 699–703, 744–745, 845–853, May-June 1957.

Merck Index, Seventh Edition, Merck and Co., Inc., Rahway, New Jersey (1960), p. 984.

JULIAN S. LEVITT, *Primary Examiner*.

F. CACCIAPAGLIA, JR., LEWIS GOTTS, *Examiners*.

UNITED STATES PATENT OFFICE
CERTIFICATE OF CORRECTION

Patent No. 3,194,736                                    July 13, 1965

Ernest Braun et al.

It is hereby certified that error appears in the above numbered patent requiring correction and that the said Letters Patent should read as corrected below.

Column 2, line 31, for "amonut" read -- amount --; line 54, for "ethors" read -- ethers --; column 3, line 14, for "or" read -- to --; column 8, line 14, for "ingredilents" read -- ingredients --; line 38, for "meta" read -- metal --; lines 39, 40 and 62, for "thioactate", each occurrence, read -- thiolactate --; column 9, line 14, for "thioacetate" read -- thiolactate --.

Signed and sealed this 8th day of February 1966.

(SEAL)
Attest:

ERNEST W. SWIDER                                                     EDWARD J. BRENNER
Attesting Officer                                                          Commissioner of Patents